(12) United States Patent
Arulsuthan et al.

(10) Patent No.: US 11,585,279 B2
(45) Date of Patent: Feb. 21, 2023

(54) SYSTEMS AND METHODS FOR CONTROLLING A BLEED-OFF VALVE OF A GAS TURBINE ENGINE (71) Applicant: PRATT & WHITNEY CANADA CORP., Longueuil (CA)

(72) Inventors: Timothy Arulsuthan, Mississauga (CA); Benjamin Roy, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 209 days.

(21) Appl. No.: 16/991,237

(22) Filed: Aug. 12, 2020

(65) Prior Publication Data
US 2022/0049660 A1 Feb. 17, 2022

(51) Int. Cl.
*F02C 9/18* (2006.01)
*F02C 9/28* (2006.01)
*F02C 9/52* (2006.01)
*F04D 27/02* (2006.01)
*F02C 7/262* (2006.01)
*F02C 6/08* (2006.01)

(52) U.S. Cl.
CPC .............. *F02C 9/18* (2013.01); *F02C 9/28* (2013.01); *F02C 9/52* (2013.01); *F04D 27/0223* (2013.01); *F02C 6/08* (2013.01); *F02C 7/262* (2013.01); *F05D 2260/606* (2013.01); *F05D 2260/85* (2013.01); *F05D 2270/092* (2013.01); *F05D 2270/101* (2013.01); *F05D 2270/304* (2013.01); *F05D 2270/3015* (2013.01)

(58) Field of Classification Search
CPC ...... F02C 9/18; F02C 9/28; F02C 9/52; F02C 6/08; F02C 7/262; F04D 27/0223; F05D 2260/606; F05D 2260/85; F05D 2270/092; F05D 2270/101; F05D 2270/3015; F05D 2270/304
See application file for complete search history.

(56) References Cited

U.S. PATENT DOCUMENTS

| | | | |
|---|---|---|---|
| 4,756,152 A | 7/1988 | Krukoski et al. | |
| 5,385,012 A * | 1/1995 | Rowe | F04D 27/0215 60/779 |
| 6,122,905 A | 9/2000 | Liu | |
| 7,647,778 B2 | 1/2010 | Zewde et al. | |
| 9,458,770 B2 | 10/2016 | Anghel et al. | |
| 9,567,906 B2 | 2/2017 | Nesdill et al. | |
| 9,797,314 B2 * | 10/2017 | Hillel | F04D 27/0261 |

(Continued)

FOREIGN PATENT DOCUMENTS

EP 1788223 A2 5/2017

*Primary Examiner* — Gerald L Sung
*Assistant Examiner* — Rene D Ford
(74) *Attorney, Agent, or Firm* — Norton Rose Fulbright Canada LLP (57) ABSTRACT Methods and systems for controlling a bleed-off valve of a gas turbine engine are described. The method comprises maintaining a first bleed-off valve associated with a first compressor of the gas turbine engine at least partially open upon detection of an unintended engine disturbance causing a drop in pressure of a combustion chamber of the engine; monitoring a rotor acceleration of the first compressor; and controlling closure of the first bleed-off valve when the rotor acceleration of the first compressor reaches a first threshold for a first duration.

20 Claims, 11 Drawing Sheets (56) References Cited

U.S. PATENT DOCUMENTS

2002/0158517 A1    10/2002   Rouse et al.
2015/0176449 A1     6/2015   Balcer
2019/0264701 A1*   8/2019   Rowe ........................ F02K 3/06

* cited by examiner

SYSTEMS AND METHODS FOR CONTROLLING A BLEED-OFF VALVE OF A GAS TURBINE ENGINE

TECHNICAL FIELD

The present disclosure relates generally to gas turbine engines, and more particularly to control of bleed-off valves in gas turbine engines.

BACKGROUND OF THE ART

When certifying a gas turbine engine, various tests are run to determine how the engine recovers from certain disturbances, such as an engine surge or an engine flame-out. A positive outcome results when the engine is able to stabilize and fully recover from the engine disturbance. A negative outcome results when the engine enters into cyclical or deeper instabilities and is unable to stabilize and fully recover from the engine disturbance.

While existing techniques for engine recovery are suitable for their purposes, improvements remain desirable.

SUMMARY

In accordance with a broad aspect, there is provided method for controlling a bleed-off valve of a gas turbine engine. The method comprises maintaining a first bleed-off valve associated with a first compressor of the gas turbine engine at least partially open upon detection of an unintended engine disturbance causing a drop in pressure of a combustion chamber of the engine; monitoring a rotor acceleration of the first compressor; and controlling closure of the first bleed-off valve when the rotor acceleration of the first compressor reaches a first threshold for a first duration.

In accordance with another broad aspect, there is provided a system for controlling a bleed-off valve of a gas turbine engine. The system comprises a processing unit and a non-transitory computer-readable medium having stored thereon program code. The program code is executable by the processing unit for maintaining a first bleed-off valve associated with a first compressor of the gas turbine engine at least partially open upon detection of an unintended engine disturbance causing a drop in pressure of a combustion chamber of the engine; monitoring a rotor acceleration of the first compressor; and controlling closure of the first bleed-off valve when the rotor acceleration of the first compressor reaches a first threshold for a first duration.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for controlling one or more bleed-off valve (BOV) of a gas turbine engine. A BOV is a valve that removes excess air pressure generated by increasing the flow through one or more upstream stages of an engine compressor. Control of the BOV varies depending on the state of the gas turbine engine. For example, the BOV is operated differently depending on whether the engine is operating in a normal state vs the engine having undergone an unintended engine disturbance (UED). A UED is used herein to define an engine event that causes a drop in pressure of a combustion chamber of the engine and causes the engine to unintentionally deviate from an expected or predicted engine behavior. Examples of a UED include an engine surge, an engine stall, and a quick relight. An engine surge is a breakdown of airflow in the compressor, causing airflow reversal towards the front of the engine. An engine stall (also referred to as a compressor stall for a gas turbine engine) is characterized by localized pockets of disrupted airflow as the compressor reaches its maximum pressure ratio for a given operating condition. It is possible to have a stable compressor stall that simply reduces engine performance and efficiency or it may also worsen and eventually lead to a full engine surge. A quick relight refers to a scenario where an inadvertent pilot manoeuvre causes the engine to shut down, following which the pilot immediately attempts to restart the inadvertently shutdown engine. Other scenarios may also qualify as a UED.

When an engine undergoes a UED, it can fall into further instabilities, which may lead to a complete loss of combustion or require the engine to be shut down and restarted. This may happen, for example, if the BOV is commanded closed too quickly post-detection of the UED. As will be described herein in more detail, a more robust recovery from the UED is provided by dictating opening and closing of the BOV post-detection as a function of a compressor spool state.

Figure 1:
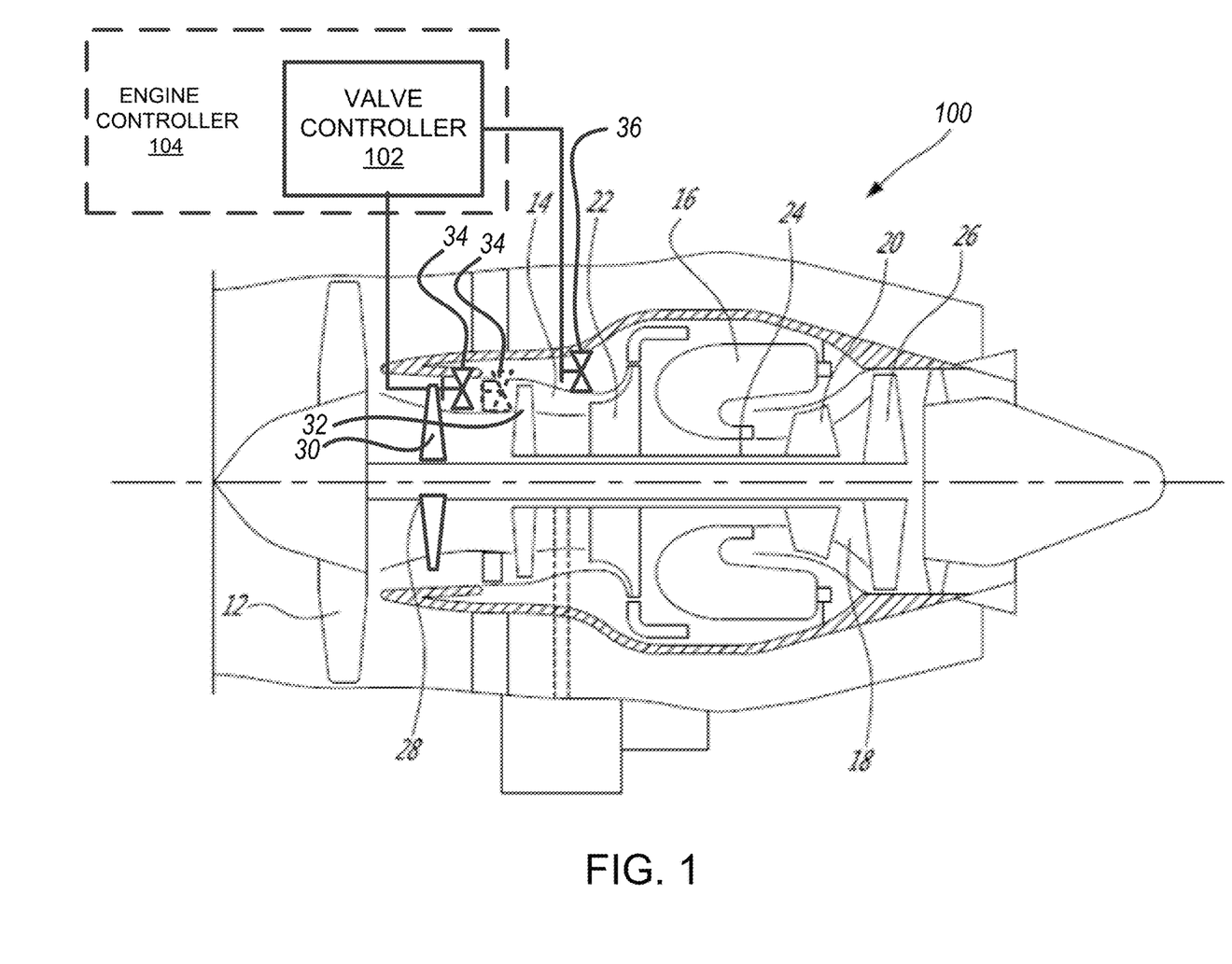
FIG. 1 is a schematic cross-sectional view of an example gas turbine engine.

The methods and systems of controlling one or more BOV as described herein are applicable to a gas turbine engine having one or more spools. FIG. 1 illustrates an example embodiment of a gas turbine engine 100 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotors 22 and 32 of the compressor section 14 through a high pressure shaft 24. Low pressure rotors 26 of the turbine section 18 are drivingly engaged to the fan rotor 12 and to low pressure rotors 30 of the compressor section 14 through a low pressure shaft 28 extending within the high pressure shaft 24 and rotating independently therefrom.

Although illustrated as a turbofan engine, the gas turbine engine 100 may alternatively be another type of engine, for example a turboshaft engine, also generally comprising in serial flow communication a compressor section, a combustor, and a turbine section. A turboprop engine or turbojet may also apply. In addition, although the engine 100 is described herein for flight applications, it should be understood that other uses, such as industrial or the like, may apply.

In the example of FIG. 1, a valve 34 is provided downstream from the low pressure rotor 30 of the compressor section 14, and is referred to herein as a low pressure compressor (LPC) BOV. A valve 36 is provided between the high pressure rotors 32 and 22 (i.e. inter-stage of a high pressure compressor) and is referred to herein as a high pressure compressor (HPC) BOV. Generally, valves 34 and 36 may be located anywhere along their respective compressor's axial location. In some embodiments, only one of valves 34, 36 is present on the gas turbine engine 100. In some embodiments, more than one valve 34 and/or more than one valve 36 is present on the gas turbine engine 100.

Control of the valves 34, 36 is effected by a valve controller 102 operatively connected thereto. In some embodiments, the valve controller 102 forms part of an engine controller 104, which may be a full-authority digital engine controls (FADEC) or other similar device, including an electronic engine control (EEC), an engine control unit (ECU) and the like. Alternatively, the valve controller 102 can be wholly or partly external to the engine controller 104 and communicatively coupled therewith.

The valve controller 102 applies an operation schedule to control the BOV as a function of an operational state of the gas turbine engine 100. For example, when the gas turbine engine 100 is in a nominal state, nominal operation schedules are applied to the valves 34, 36 by the valve controller 102. The nominal state refers to the gas turbine engine 100 operating in accordance with a predicted or expected operation. The nominal operation schedule for valve 34 may differ from the nominal operation schedule for valve 36 due to their different location within the gas turbine engine 100 or due to the nature of the valve. The specific commands for each nominal operation schedule are known to those skilled in the art.

When the BOV is an on/off type valve, the operation schedule consists in commands to open and close the valve at various instances in time. When the BOV is a valve that can be modulated, i.e. it can be set to a number of intermediate positions between the fully open and fully closed positions, the operation schedule consists in commands to set the position of the valve at various instances in time.

Figure 2A:
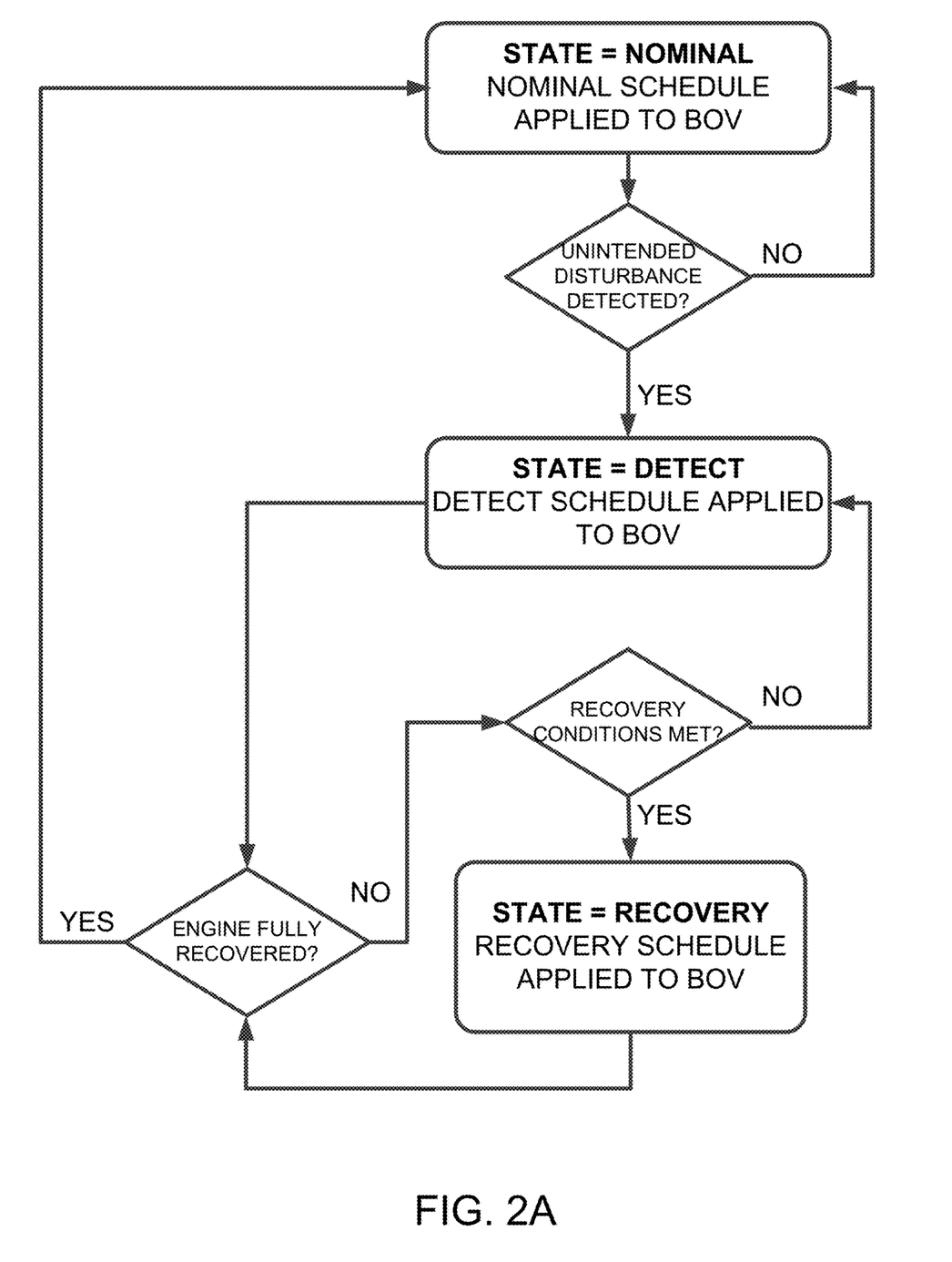
FIGS. 2A-2B are examples of control logic for controlling bleed-off valves.

Referring to FIG. 2A, there is illustrated an example embodiment of control logic for transitioning between the various operation schedules for a given BOV. Three states are associated with the gas turbine engine 100, and they are "nominal", "detect", and "recovery". A corresponding operation schedule for the BOV is associated with each engine state, namely a "nominal schedule", a "detect schedule", and a "recovery schedule", respectively. It will be appreciated that the nominal engine state may be broken down into a plurality of distinct states, and each state may have one or more operation schedule associated thereto. A single nominal state is used herein for simplicity. The detect state refers to the detection of a deviation from the expected or predicted operation of the gas turbine engine due to the UED. The recovery state refers to the gas turbine engine recovering from the UED, prior to full recovery from the UED.

In the embodiment of FIG. 2A, the nominal schedule is applied to the BOV until a UED is detected, after which the detect schedule is applied thereto. Generally, the detect schedule comprises one or more command to open the BOV.

Once the engine enters the detect state, a determination is made as to whether the engine has fully recovered. The criteria for full recovery can vary as a function of the nature of the UED and are readily understood by those skilled in the art. For example, for an engine flameout, full recovery may correspond to the rotational speed of the low pressure spool (N1) reaching a certain percentage of $N1_{ref}$. For an engine surge, full recovery may correspond to N1 being within a certain tolerance as function of the throttle position. The full recovery criteria can vary depending on practical implementations.

When the full recovery criteria are met, the engine returns to the nominal state and the nominal schedule is applied to the BOV. If the engine is not deemed to be fully recovered, a determination is made as to whether certain recovery conditions are met. The recovery conditions are based on the acceleration of at least one compressor of the gas turbine engine 100 and serve to ensure that the BOV remains open long enough to allow the engine to stabilize following the UED, so as to avoid further instabilities. If the recovery conditions are not met, the detect schedule is maintained. If the recovery conditions are met, a recovery schedule is applied to the BOV. The recovery schedule consists in one or more command intended to progressively transition the BOV from the fully open position (as per the detect schedule) back toward the Nominal schedule. In most cases, the Nominal schedule dictates that the BOV be closed and therefore the progressive transition is from the fully open position toward the closed position. In some cases, the Nominal schedule dictates that the BOV be fully open and so the recovery schedule would maintain the BOV fully open.

In some embodiments, the recovery conditions, and therefore the timing of the closure of the BOV, are based on the rotor acceleration of a compressor associated with the BOV. For example, recovery conditions for valve 34 are based on the acceleration of the low pressure rotors 30, i.e. of the low pressure compressor spool, also referred to as N1dot. As such, the recovery schedule may be applied to valve 34 when N1dot reaches a first threshold for a first duration. The recovery schedule is maintained until the UED is fully recovered and upon which the valve 34 is returned to nominal control.

Similarly, recovery conditions for valve 36 are based on the acceleration of the high pressure rotors 32, i.e. of the high pressure compressor spool, also referred to as N2dot. As such, the recovery schedule may be applied to valve 36 when N2dot reaches a second threshold for a second duration. The recovery schedule is maintained until the UED is fully recovered and upon which the valve 36 is returned to nominal control.

Figure 2B:
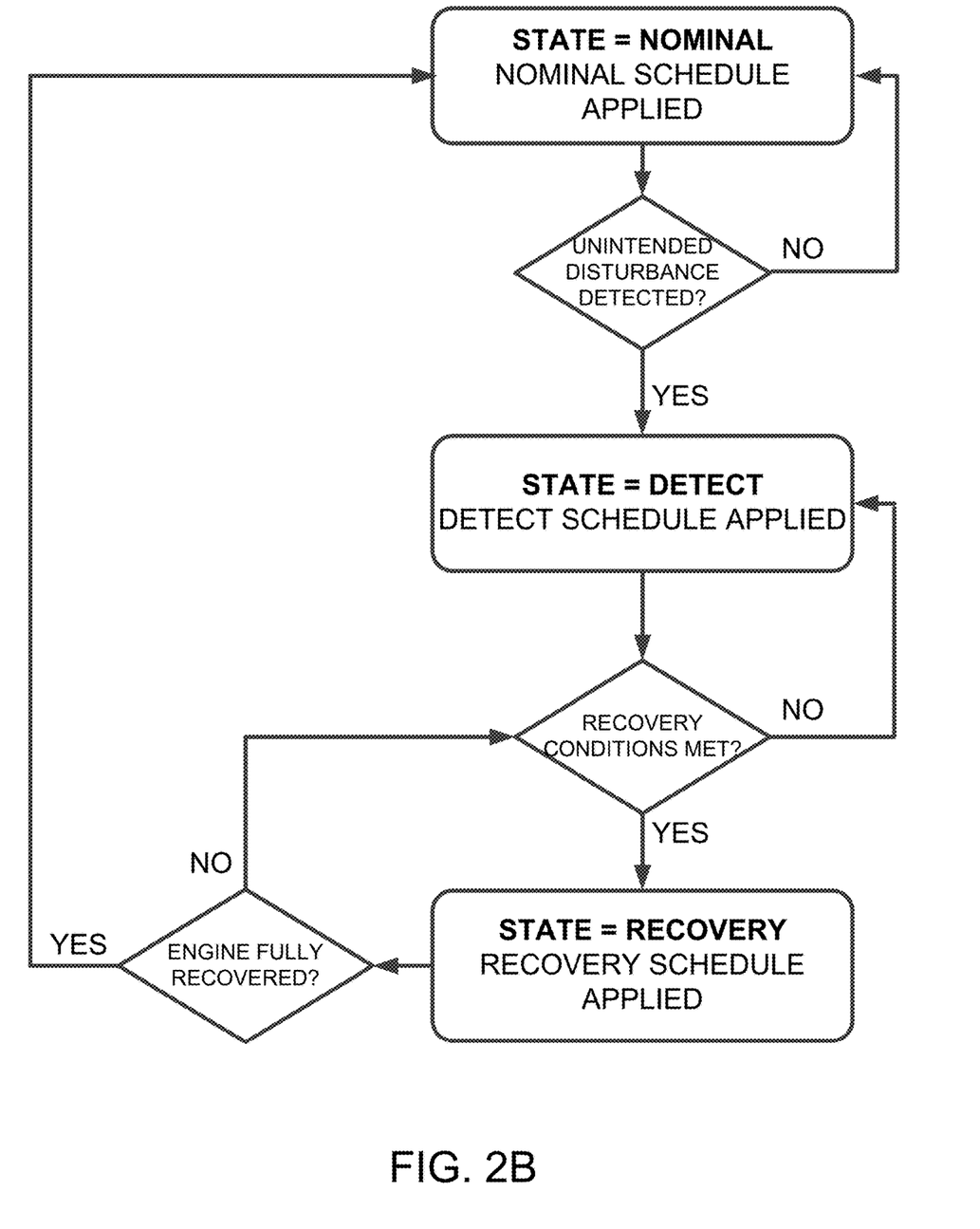

It will be appreciated that the control logic of FIG. 2A is an example and alternative embodiments can exist. FIG. 2B illustrates one such alternative embodiment, whereby once a UED is detected and the detect schedule is applied to the BOV, a determination is made with regards to the recovery conditions. If the recovery conditions are met, the recovery schedule is applied to the BOV. If the recovery conditions are not met, the detect schedule is maintained. In contrast, in the embodiment of FIG. 2A, the engine may go from the detect state to the nominal state without entering the recovery state if the engine fully recovers quickly enough. However in both embodiments, transitioning from the detect schedule to the recovery schedule depends on the recovery conditions, which are based on the acceleration of a compressor spool.

In some embodiments, the recovery conditions are based on the acceleration of more than one compressor. For example, closing of the LPC BOV post-detection of a UED may depend on the acceleration of both the low pressure compressor spool and the high pressure compressor spool. Similarly, closing of the HPC BOV post-detection of a UED may depend on the acceleration of both the low pressure compressor spool and the high pressure compressor spool.

Figure 3:
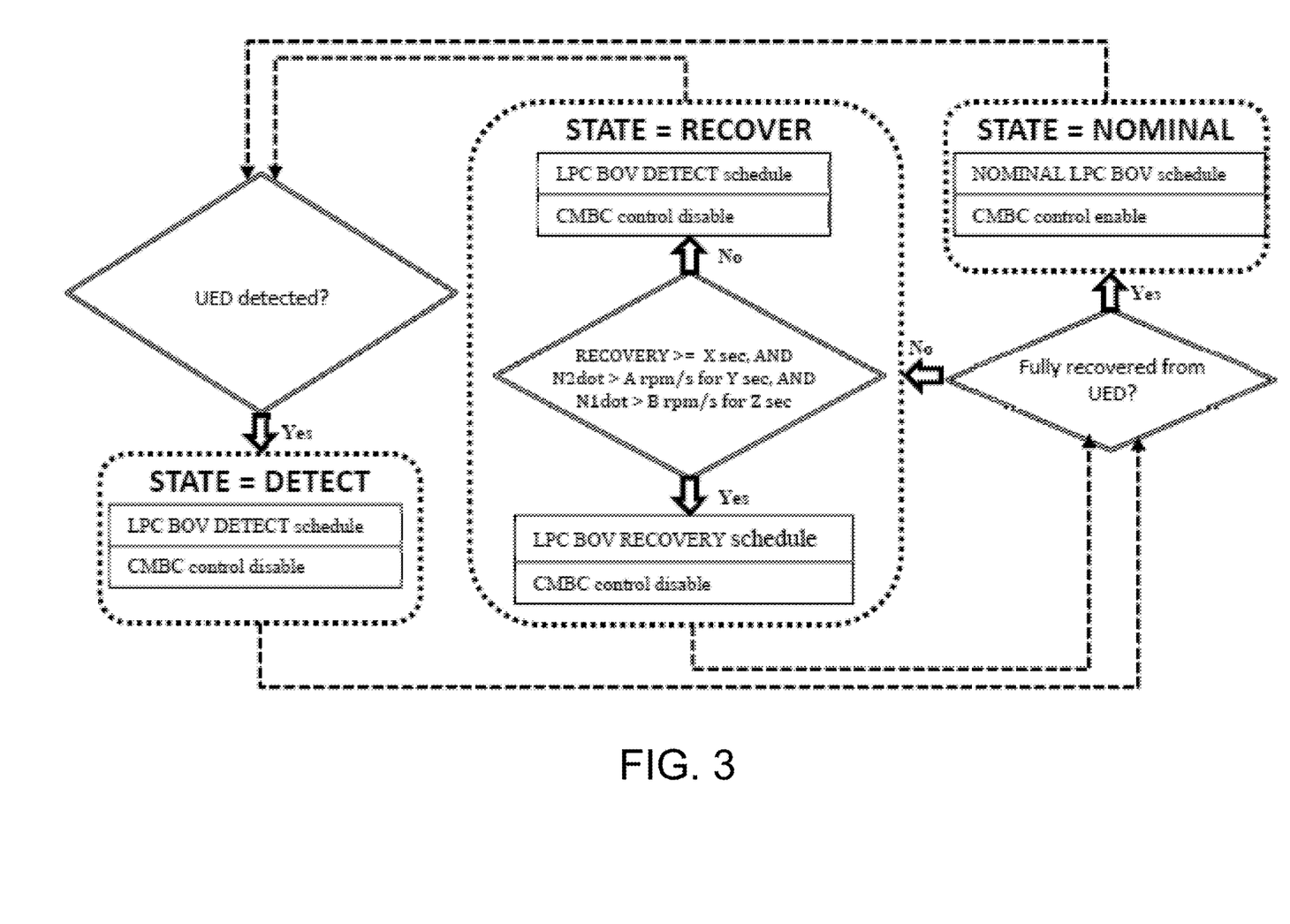
FIG. 3 is an example of control logic for controlling a low pressure compressor bleed-off valve.

A specific and non-limiting example is illustrated in FIG. 3 for the LPC BOV. In this example, control of the LPC BOV, i.e. valve 34, is based on the state of low and high compressor spool acceleration (N1dot and N2dot) when a UED has been detected. More specifically, the valve controller 102 will continue to apply the detect schedule to the valve 34 for at least X seconds and until N1dot is >A rpm/s for Y consecutive seconds and N2dot>B rpm/s for Z consecutive seconds. The acceleration thresholds for the high and low compressor spools are indicative that the engine has begun to recover. The recovery schedule will eventually close the valve 34 as a function of low pressure compressor speed, which may be corrected to engine inlet conditions (N1C2). Keeping the LPC BOV open as long as possible and at least until the engine is sufficiently re-accelerating causes the operating line of the low pressure compressor to be continuously lowered, first by the BOV opening and then by increasing the swallowing capacity of the high pressure compressor caused by the acceleration. This allows for a more robust recovery sequence from the UED by ensuring that any LPC disturbances or rotating stall are cleared, which if they are not, would lead to subsequent engine surges as the engine reaccelerates up to its nominal operating speed.

Figure 4:
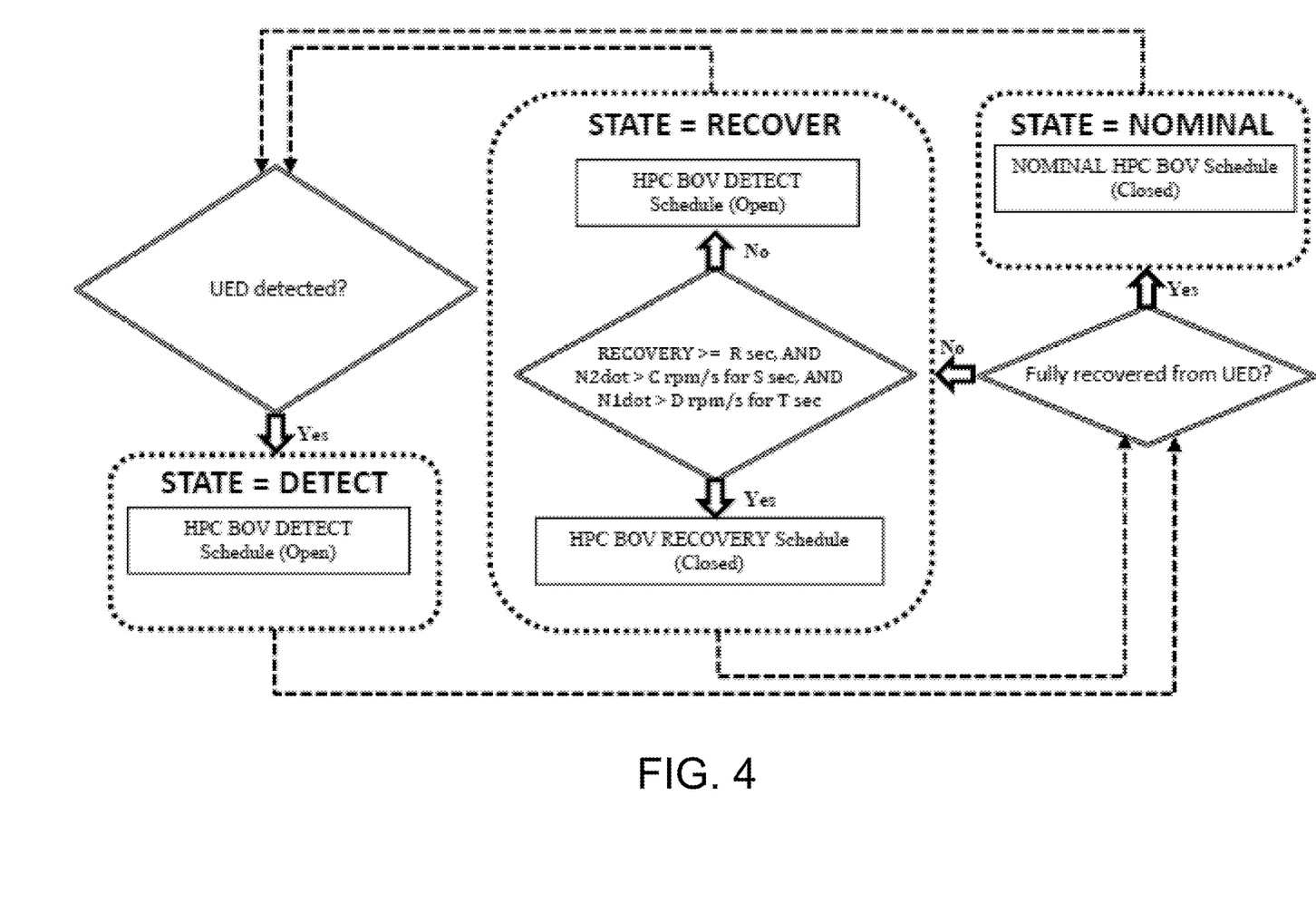
FIG. 4 is an example of control logic for controlling a high pressure compressor bleed-off valve.

Constrained Model Based Control (CMBC) is a mode of engine control that can be used to control the LPC BOV and do so, in some implementations, via a schedule as a function of $N1_{ref}$ and effector limits. In some embodiments, the CMBC mode is disabled upon detection of the UED and only enabled once the engine returns to the nominal state, such that the BOV can be scheduled as a function of N1C2 instead to better match the LPC BOV opening with the low power compressor current state of operation A specific and non-limiting example is illustrated in FIG. 4 for the HPC BOV. In this example, control of the HPC BOV, i.e. valve 36, is based on the state of low and high compressor spool acceleration (N1dot and N2dot) when a UED has been detected. More specifically, the valve controller 102 will continue to apply the detect schedule to the valve 36 (i.e. maintain the valve open) for at least R seconds and until N1dot is >D rpm/s for T consecutive seconds and N2dot>C rpm/s for S consecutive seconds. The acceleration thresholds for the high and low compressor spools are indicative that the engine has begun to recover. Keeping the HPC BOV open helps clear the LPC rotating stall by improving LPC stall margin, until the engine is sufficiently re-accelerating. The nominal HPC BOV schedule is re-established when it has been determined that the engine has fully recovered from the UED.

In some embodiments, it may be desirable to limit the potential exposure of hardware surrounding the HPC BOV to high temperatures for prolonged periods of time. Bleed discharge characteristics and/or the location of the HPC BOV may be factors considered for this issue. As such, another parameter can be added to the recovery conditions for the HPC BOV, for example a time limit corresponding to a maximum allowable time that the HPC BOV is permitted to remain open. When the time limit is reached, the recovery schedule is applied in order to close the HPC BOV. Other parameters such as HPC spool speed, engine temperature, and the like may also be used.

Figure 5:
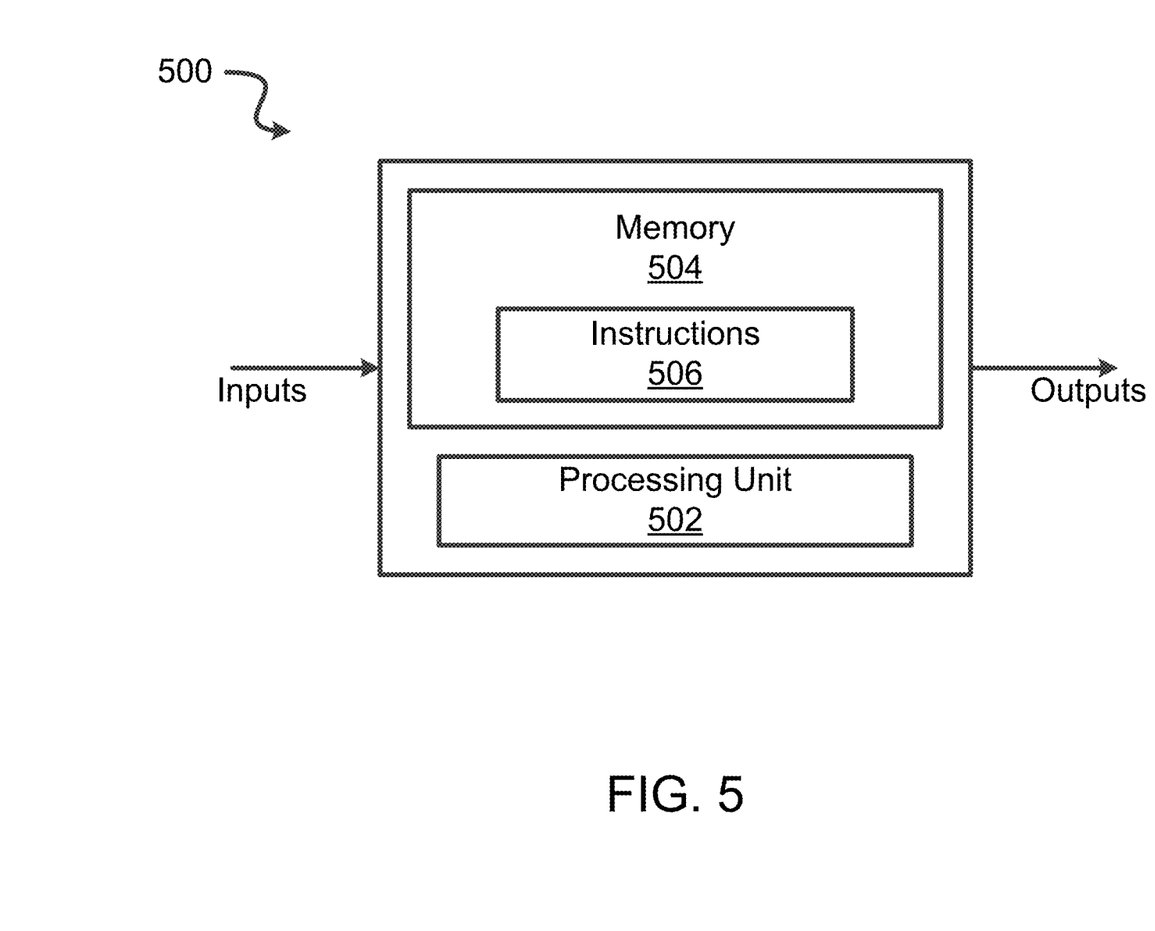
FIG. 5 is a block diagram of an example computing device for implementing a valve controller.

In some embodiments, the valve controller 102 can be implemented as a computing device 500 as illustrated in FIG. 5, as part of the engine controller 104 or separately therefrom. Indeed, the computing device 500 can form part or all of the engine controller 104. In some embodiments, the computing device 500 is within the engine controller 104 and cooperates with other hardware and/or software components therein. In such cases, the engine controller 104 controls operation of the BOV(s). In some embodiments, the computing device 500 is external to the engine controller 104 and interacts with the engine controller 104, for example to obtain the status of the engine and/or the compressor spool acceleration values. In some embodiments, some hardware and/or software components are shared between the engine controller 104 and the computing device 500, without the computing device 500 being integral to the engine controller 104. In this case, the engine controller 104 can perform part of the steps for controlling the BOV(s).

The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause functions/acts/steps described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Figure 6A:
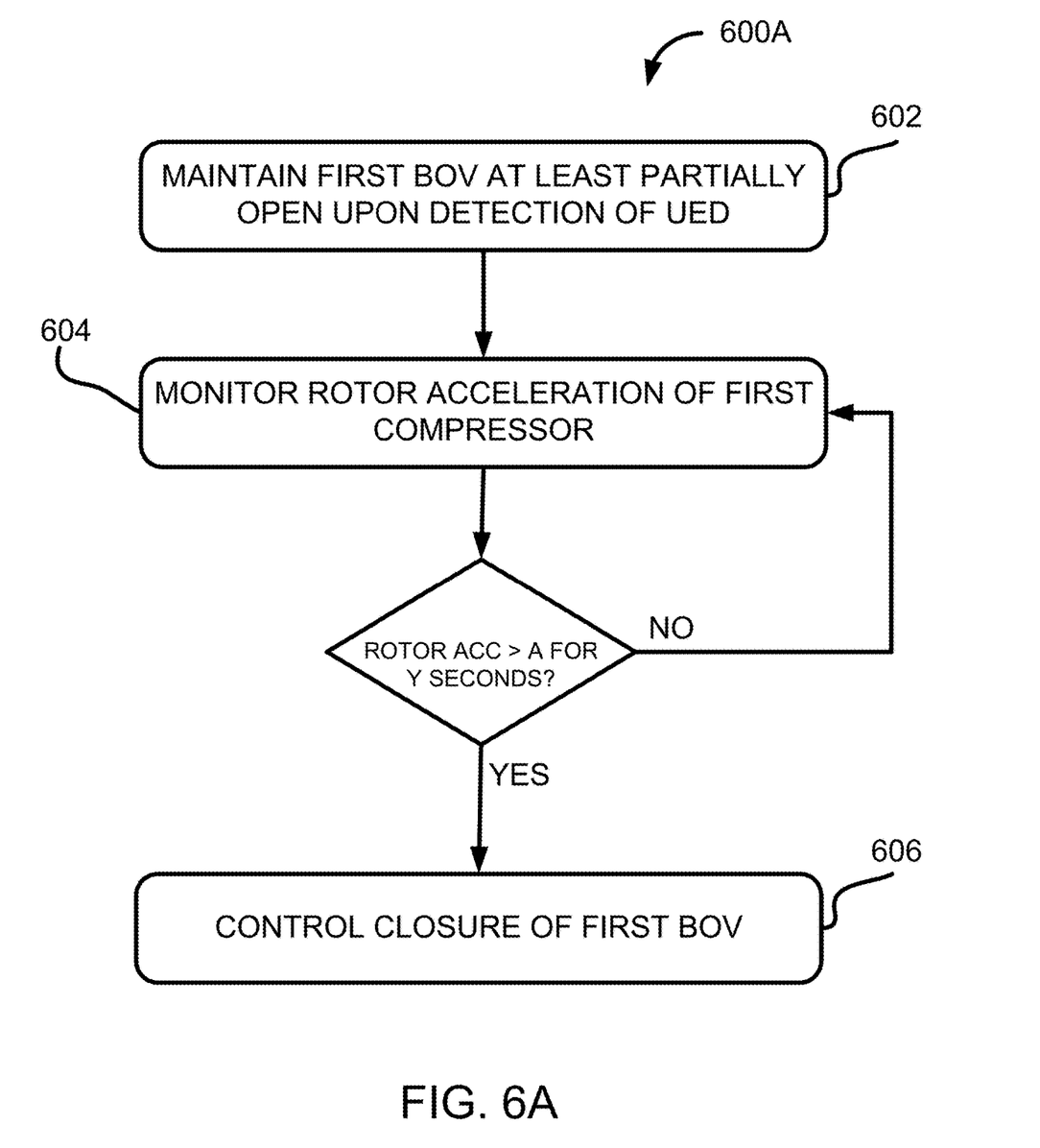
FIGS. 6A-6E are flowcharts of example methods for controlling a bleed-off valve.

With reference to FIG. 6A, there is illustrated an example method 600A for controlling a BOV of a gas turbine engine, as performed, for example, by the computing device 500. At step 602, a first BOV associated with a first compressor of the gas turbine engine is maintained at least partially open upon detection of a UED. For example, the first BOV can be the LPC BOV and the first compressor can be the LPC, or the first BOV can be the HPC BOV and the first compressor can be the HPC.

At step 604, the rotor acceleration of the first compressor is monitored. In some embodiments, the rotor acceleration is obtained by the valve controller 102 from the engine controller 104. Alternatively, the valve controller 102 may itself obtain values for the rotor acceleration of the first compressor directly from one or more sensors on the gas turbine engine. Also alternatively, the valve controller 102 may compute or estimate the rotor acceleration of the first compressor from one or more other engine parameter. Other embodiments may also apply.

When the rotor acceleration of the first compressor reaches a first threshold (i.e. A) for a first duration (i.e. Y seconds), controlled closure of the first BOV is performed, as per step 606. Controlled closure refers to progressively controlling the closure of the BOV back to its nominal operating schedule and will vary depending on but not limited to the location of the BOV within the compressor arrangement, the compressor arrangement itself, the nature of the BOV, parameters used to monitor the progression of the UED recovery and parameters used to define the nominal schedule of the BOV. In some embodiments, controlled closure comprises a direct command to close the BOV. In some embodiments, controlled closure comprises a series of commands to go from an open position to a fully closed position. In some embodiments, controlled closure comprises maintaining the BOV physically open for most of controlled closure process. If the nominal schedule at the operating point the engine is trying to recover to dictates that the BOV be fully open, the BOV would never by physically commanded closed during controlled closure.

In some embodiments of the method 600A, the first BOV is a variable opening LPC BOV and controlling closure comprises modulating the first BOV as a function of LPC spool speed (N1) until full recovery of the UED and return to nomincal LPC BOV scheduling. The LPC spool speed may be corrected for engine inlet conditions (N1C2). In some embodiments, the first BOV is an open/close HPC BOV and controlling closure comprises closing the first BOV. It will be understood that the first BOV may be any BOV provided in the gas turbine engine downstream from a compressor component.

Figure 6B:
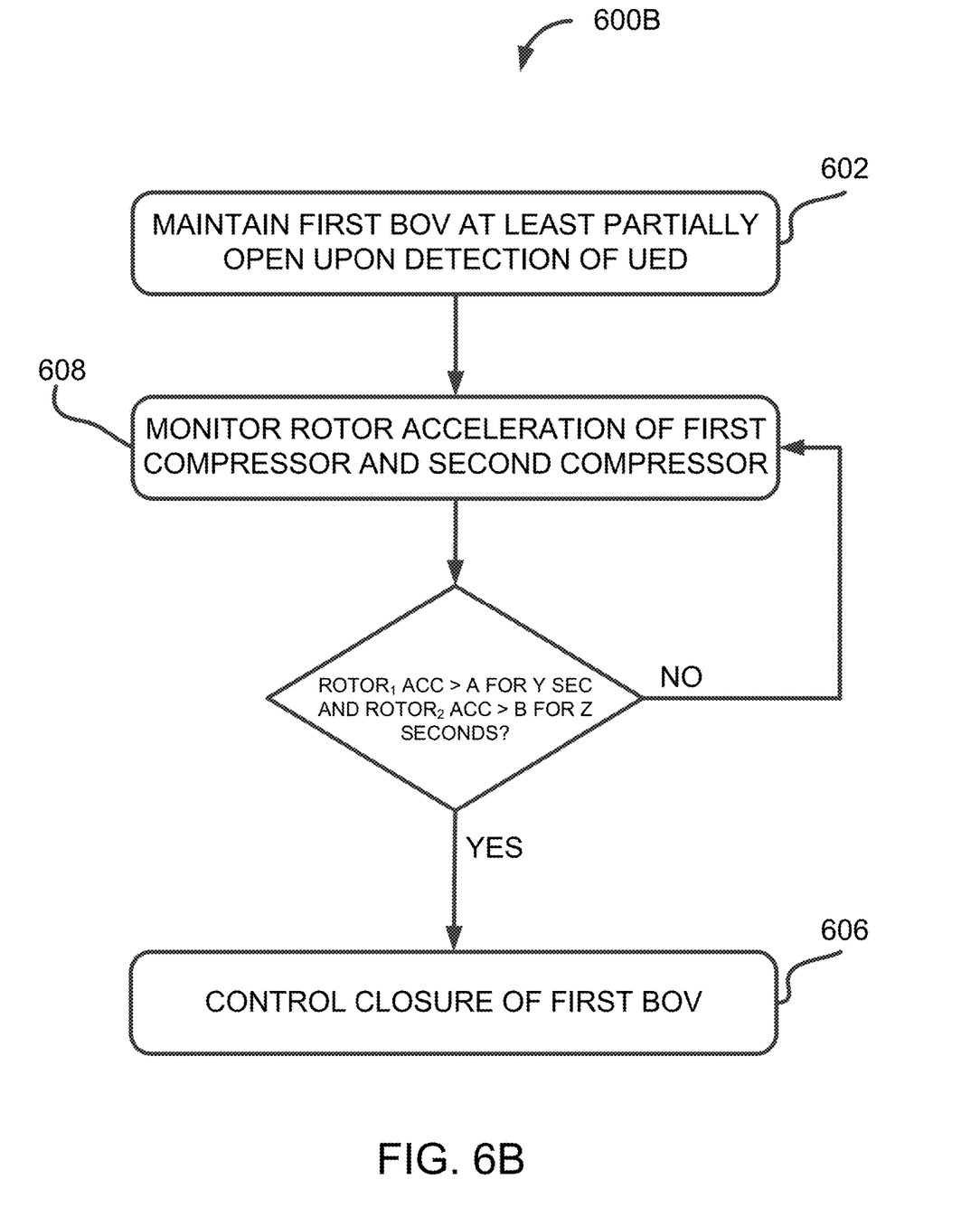

In some embodiments, the recovery conditions for the first BOV include rotor acceleration values and durations for two compressors. An example method 600B for controlling a BOV in accordance with this embodiment is illustrated in FIG. 6B. The method 600B includes step 608 of monitoring the rotor acceleration of a first compressor (ROTOR$_1$ ACC) and a second compressor (ROTOR$_2$ ACC). Furthermore, closure of the first BOV is effected when the rotor acceleration of the first pressure compressor reaches the first threshold (i.e. A) for the first duration (i.e. Y seconds) and the rotor acceleration of the second compressor reaches a second threshold (i.e. B) for a second duration (i.e. Z seconds).

In some embodiments of the method 600B, the first BOV is an LPC BOV, the first compressor is an LPC and the second compressor is an HPC. In some embodiments, the first BOV is an HPC BOV, the first compressor is an HPC and the second compressor is an LPC. It will be understood that the method 600B may also be applied to more than two compressors.

Figure 6C:
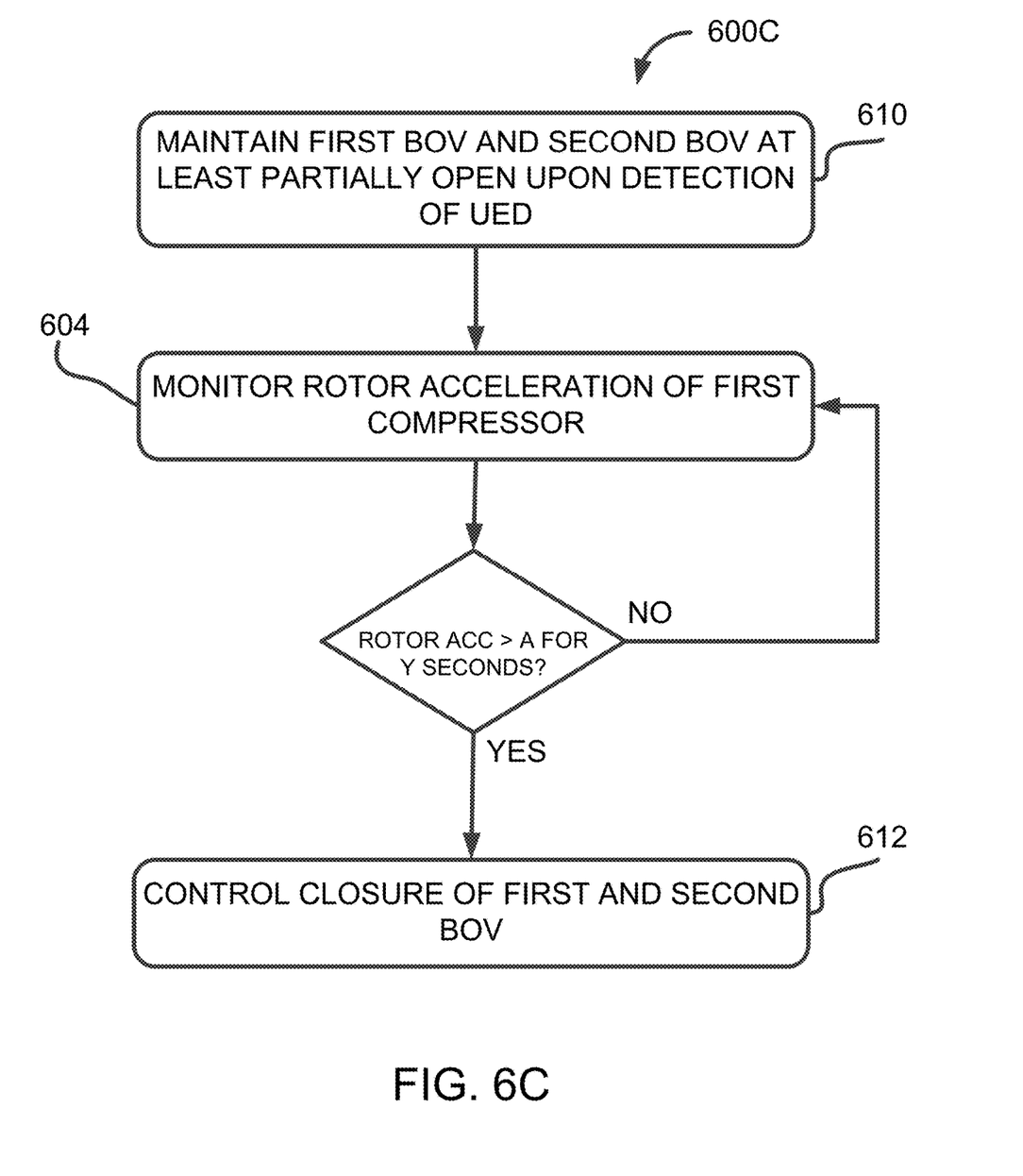

In some embodiments, the method for controlling a BOV is adapted to two BOVs associated with a same compressor. For example, referring back to FIG. 1, there may be more than one valve 34 downstream from the low pressure compressor rotors 28 and upstream from the high pressure compressor rotors 32. An example method 600C for controlling a BOV in accordance with this embodiment is illustrated in FIG. 6C. The method 600C includes a step 610 of maintaining a first BOV and a second BOV at least partially open upon detection of a UED, and a step 612 of controlling closure of the first BOV and the second BOV when the rotor acceleration of the first compressor reaches the first threshold (i.e. A) for the first duration (i.e. Y seconds).

Figure 6D:
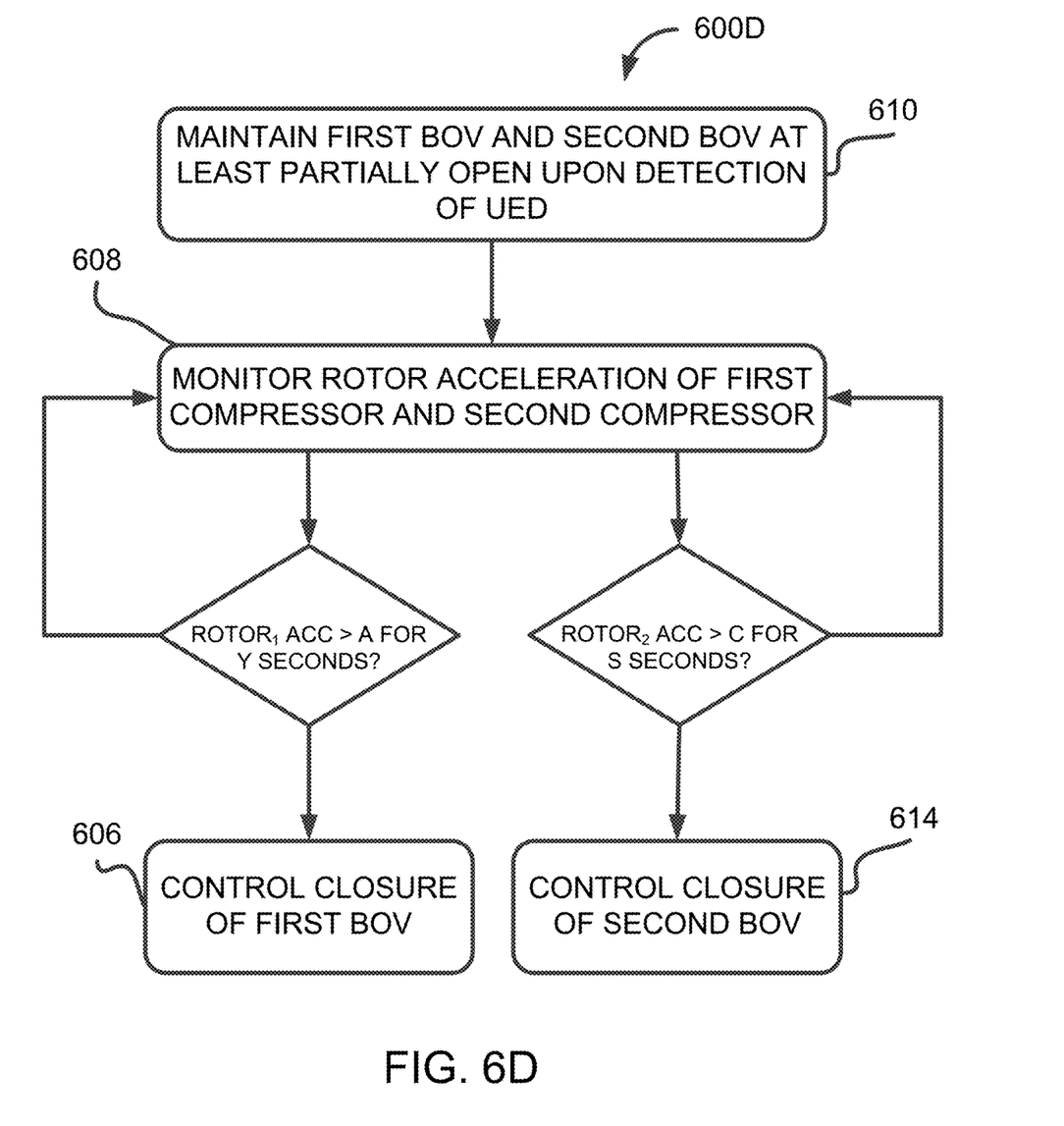

In some embodiments, the method for controlling a BOV is adapted to two BOVs, each associated with a different compressor, an example of which is illustrated in FIG. 6D. Method 600D includes step 610 as per method 600C and step 608 as per method 600B. Step 606 of controlling closure of the first BOV is performed when the rotor acceleration of the first pressure compressor (ROTOR$_1$ ACC) reaches the first threshold (i.e. A) for the first duration (i.e. Y seconds). Step 614 of controlling closure of the second BOV is performed when the rotor acceleration of the second compressor (ROTOR$_2$ ACC) reaches the second threshold (i.e. B) for the second duration (i.e. Z seconds).

Figure 6E:
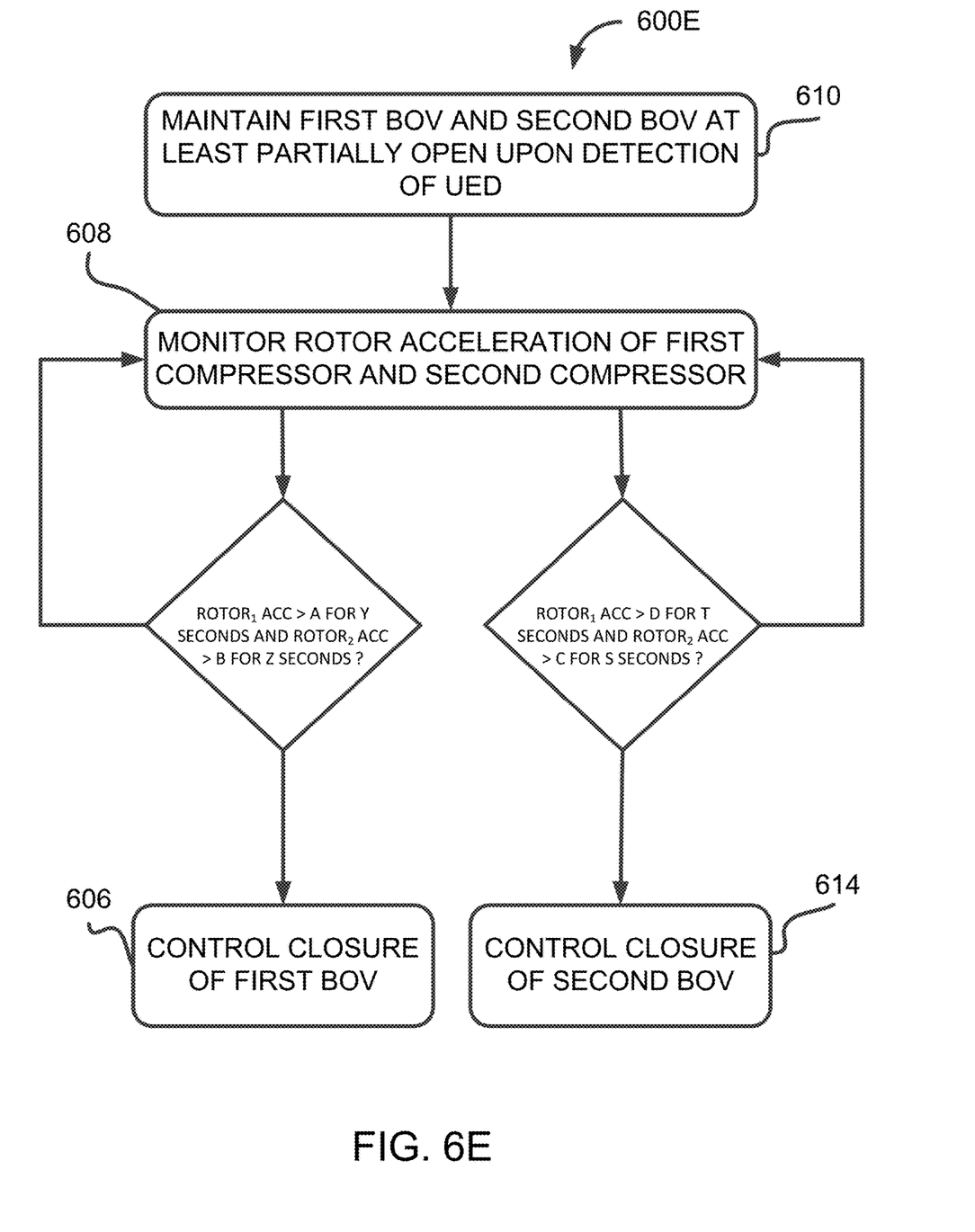

In some embodiments, the recovery conditions for the first BOV and the second BOV include rotor acceleration values and durations for two compressors. An example method 600E for controlling the BOVs in accordance with this embodiment is illustrated in FIG. 6E. Step 606 of controlling closure of the first BOV is performed when the rotor acceleration of the first pressure compressor reaches the first threshold (i.e. A) for the first duration (i.e. Y seconds) and the rotor acceleration of the second compressor reaches the second threshold (i.e. B) for the second duration (i.e. Z seconds). Step 614 of controlling closure of the second BOV is performed when the rotor acceleration of the first pressure compressor reaches a third threshold (i.e. D) for a third duration (i.e. T seconds) and the rotor acceleration of the second compressor reaches a fourth threshold (i.e. C) for a fourth duration (i.e. S seconds).

In some embodiments of the method 600E, the first BOV is an LPC BOV, the first compressor is an LPC, the second BOV is an HPC BOV and the second compressor is an HPC.

In some embodiments, an additional persistence timer or other sensor feedback or criteria related to the engine state and type of UED is applied to the recovery conditions of any one of methods 600A-600E, so as to ensure that the BOV(s) remain open for at least a given duration before control closure thereof.

The steps for the methods 600A-600E may be embodied as instructions 506 stored in memory 504 of the computing device 500.

The methods and systems for controlling a BOV of a gas turbine engine described herein may be implemented in a high level procedural or object oriented programming or scripting language, or a combination thereof, to communicate with or assist in the operation of a computer system, for example the computing device 500. Alternatively, the methods and systems for controlling a BOV may be implemented in assembly or machine language. The language may be a compiled or interpreted language. Program code for implementing the methods and systems for controlling a BOV may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling a BOV may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the methods 600A-600E.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the persistence timers (R, S, T, X, Y, and Z) and acceleration criteria (A, B, C, and D) used on both high and low compressor spools may be modified. Similarly, the dedicated BOV detect and recovery schedules may be modified and robustness may be added using, for example, altitude, airspeed, outside air temperature, and other parameters as dependencies to the schedules. Yet further modifications could be implemented by a person of ordinary skill in the art in view of the present disclosure, which modifications would be within the scope of the present technology.

The invention claimed is:

1. A method for controlling a bleed-off valve of a gas turbine engine, the method comprising:
   maintaining a first bleed-off valve associated with a first compressor of the gas turbine engine at least partially open upon detection of an unintended engine disturbance causing a drop in pressure of a combustion chamber of the engine;
   monitoring a rotor acceleration of the first compressor;
   continuing to maintain a first bleed-off valve associated with a first compressor of the gas turbine engine at least partially open until the rotor acceleration of the first compressor reaches a first acceleration threshold for a first duration; and
   controlling closure of the first bleed-off valve when the rotor acceleration of the first compressor reaches the first acceleration threshold for the first duration.

2. The method of claim 1, wherein the first compressor is a low pressure compressor and the first bleed-off valve is a low pressure compressor bleed-off valve, and wherein controlling closure of the first bleed-off valve comprises modulating the first bleed-off valve as a function of a speed of the low pressure compressor until a fully closed position of the bleed-off valve is reached.

3. The method of claim 2, further comprising monitoring a rotor acceleration of a high pressure compressor of the engine, and wherein controlling closure of the first bleed-off valve comprises controlling closure when the rotor acceleration of the low pressure compressor reaches the first acceleration threshold for the first duration and the rotor acceleration of the high pressure compressor reaches a second acceleration threshold for a second duration.

4. The method of claim 2, further comprising disabling a nominal mode of control of the first bleed-off valve upon detection of the unintended engine disturbance, wherein the nominal mode of control is a function of a reference speed of the low pressure compressor and effector limits.

5. The method of claim 1, wherein the first compressor is a high pressure compressor and the first bleed-off valve is a high pressure compressor bleed-off valve, and wherein controlling closure of the first bleed-off valve comprises closing the first bleed-off valve.

6. The method of claim 5, further comprising monitoring a rotor acceleration of a low pressure compressor of the engine, and wherein controlling closure of the first bleed-off valve comprises controlling closure when the rotor acceleration of the high pressure compressor reaches the first acceleration threshold for the first duration and the rotor acceleration of the low pressure compressor reaches a second acceleration threshold for a second duration.

7. The method of claim 1, further comprising:
   maintaining a second bleed-off valve associated with the first compressor of the gas turbine engine at least partially open upon detection of the unintended engine disturbance; and
   controlling closure of the second bleed-off valve when the rotor acceleration of the first compressor reaches the first acceleration threshold for the first duration.

8. The method of claim 1, further comprising:
   maintaining a second bleed-off valve associated with a second compressor of the gas turbine engine at least partially open upon detection of the unintended engine disturbance;
   monitoring a rotor acceleration of the second compressor; and
   controlling closure of the second bleed-off valve when the rotor acceleration of the second compressor reaches a second acceleration threshold for a second duration.

9. The method of claim 8, wherein:
   the first compressor is a low pressure compressor, the first bleed-off valve is a low pressure compressor bleed-off valve, the second compressor is a high pressure compressor, and the second bleed-off valve is a high pressure compressor bleed-off valve;
   controlling closure of the first bleed-off valve comprises controlling closure when the rotor acceleration of the low pressure compressor reaches the first acceleration threshold for the first duration and the rotor acceleration of the high pressure compressor reaches a third acceleration threshold for a third duration; and
   controlling closure of the second bleed-off valve comprises controlling closure when the rotor acceleration of the high pressure compressor reaches the second acceleration threshold for the second duration and the rotor acceleration of the low pressure compressor reaches a fourth acceleration threshold for a fourth duration.

10. The method of claim 1, wherein the unintended engine disturbance is one of a flameout, a surge, and a quick relight.

11. A system for controlling a bleed-off valve of a gas turbine engine, the system comprising:
    a processing unit; and
    a non-transitory computer-readable medium having stored thereon program code executable by the processing unit for:
       maintaining a first bleed-off valve associated with a first compressor of the gas turbine engine at least partially open upon detection of an unintended engine disturbance causing a drop in pressure of a combustion chamber of the engine;
       monitoring a rotor acceleration of the first compressor;
       continuing to maintain a first bleed-off valve associated with a first compressor of the gas turbine engine at least partially open until the rotor acceleration of the first compressor reaches a first acceleration threshold for a first duration; and controlling closure of the first bleed-off valve when the rotor acceleration of the first compressor reaches the first acceleration threshold for the first duration.

12. The system of claim 11, wherein the first compressor is a low pressure compressor and the first bleed-off valve is a low pressure compressor bleed-off valve, and wherein controlling closure of the first bleed-off valve comprises modulating the first bleed-off valve as a function of a speed of the low pressure compressor until a fully closed position of the bleed-off valve is reached.

13. The system of claim 12, wherein the program code is further executable for monitoring a rotor acceleration of a high pressure compressor of the engine, and wherein controlling closure of the first bleed-off valve comprises controlling closure when the rotor acceleration of the low pressure compressor reaches the first acceleration threshold for the first duration and the rotor acceleration of the high pressure compressor reaches a second acceleration threshold for a second duration.

14. The system of claim 12, wherein the program code is further executable for disabling a nominal mode of control of the first bleed-off valve upon detection of the unintended engine disturbance, wherein the nominal mode of control is a function of a reference speed of the low pressure compressor and effector limits.

15. The system of claim 11, wherein the first compressor is a high pressure compressor and the first bleed-off valve is a high pressure compressor bleed-off valve, and wherein controlling closure of the first bleed-off valve comprises closing the first bleed-off valve.

16. The system of claim 15, wherein the program code is further executable for monitoring a rotor acceleration of a low pressure compressor of the engine, and wherein controlling closure of the first bleed-off valve comprises controlling closure when the rotor acceleration of the high pressure compressor reaches the first acceleration threshold for the first duration and the rotor acceleration of the low pressure compressor reaches a second acceleration threshold for a second duration.

17. The system of claim 11, wherein the program code is further executable for:

maintaining a second bleed-off valve associated with the first compressor of the gas turbine engine at least partially open upon detection of the unintended engine disturbance; and controlling closure of the second bleed-off valve when the rotor acceleration of the first compressor reaches the first acceleration threshold for the first duration.

18. The system of claim 11, wherein the program code is further executable for:

maintaining a second bleed-off valve associated with a second compressor of the gas turbine engine at least partially open upon detection of the unintended engine disturbance;

monitoring a rotor acceleration of the second compressor; and controlling closure of the second bleed-off valve when the rotor acceleration of the second compressor reaches a second acceleration threshold for a second duration.

19. The system of claim 18, wherein:

the first compressor is a low pressure compressor, the first bleed-off valve is a low pressure compressor bleed-off valve, the second compressor is a high pressure compressor, and the second bleed-off valve is a high pressure compressor bleed-off valve;

controlling closure of the first bleed-off valve comprises controlling closure when the rotor acceleration of the low pressure compressor reaches the first acceleration threshold for the first duration and the rotor acceleration of the high pressure compressor reaches a third acceleration threshold for a third duration; and controlling closure of the second bleed-off valve comprises controlling closure when the rotor acceleration of the high pressure compressor reaches the second acceleration threshold for the second duration and the rotor acceleration of the low pressure compressor reaches a fourth acceleration threshold for a fourth duration.

20. The system of claim 11, wherein the unintended engine disturbance is one of a flameout, a surge, and a quick relight.

* * * * *